United States Patent

Hamanaka et al.

[19]

[11] Patent Number: 6,106,750
[45] Date of Patent: Aug. 22, 2000

[54] LAMINATED SKIN MATERIAL, MOLDING METHOD AND LAMINATED MOLDED ARTICLE

[75] Inventors: Tatsuo Hamanaka, Chiba; Koji Yamashita, Fukui; Masahito Matsumoto, Osaka, all of Japan

[73] Assignee: Sumitomo Chemical Company, Ltd., Osaka, Japan

[21] Appl. No.: 09/237,796

[22] Filed: Jan. 27, 1999

Related U.S. Application Data

[62] Division of application No. 08/827,426, Mar. 27, 1997, abandoned.

[30] Foreign Application Priority Data

Mar. 28, 1996 [JP] Japan ..................................... 8-074476

[51] Int. Cl.$^7$ .................................................. B29C 67/20

[52] U.S. Cl. ......................... 264/46.4; 156/77; 264/46.8; 264/241

[58] Field of Search ................................. 264/45.1, 46.4, 264/46.8, 241; 156/77

[56] References Cited

U.S. PATENT DOCUMENTS 5,516,582  5/1996  Hikasa et al. .
5,532,055  7/1996  Igarashi et al. .

FOREIGN PATENT DOCUMENTS

0298739A2  1/1989  European Pat. Off. .
0564267A2  10/1993  European Pat. Off. .
04073112   3/1992  Japan .

Primary Examiner—Blaine Copenheaver

[57] ABSTRACT

A laminated skin material comprising an olefin thermoplastic elastomer composition layer and an olefin resin foam layer which does not cause undesirable break, unevenness and wrinkle of the skin material when a laminated molded article is produced by disposing the laminated skin material between male and female molds, feeding a molten thermoplastic resin between the laminated skin material and the male or female molds, and integrally laminating the skin material and thermoplastic resin; a molding method using the laminated skin material, a molding method in which a laminated skin material used in the method is preheated which give a laminated molded article having good appearance and the laminated molded article.

9 Claims, 5 Drawing Sheets

LAMINATED SKIN MATERIAL, MOLDING METHOD AND LAMINATED MOLDED ARTICLE

This application is a divisional of application Ser. No. 08/827,426, filed on Mar. 27, 1997, now abandoned, the entire contents of which are hereby incorporated by reference.

FIELD OF THE INVENTION

The present invention relates to a laminated skin material, a molding method and a laminated molded article. More particularly, it relates to a laminated skin material comprising an olefin thermoplastic elastomer composition layer and an olefin resin foam layer which does not cause undesirable break, unevenness and wrinkle of the skin material when a laminated molded article is produced by disposing the laminated skin material between male and female molds, feeding a molten thermoplastic resin between the laminated skin material and the male or female molds, and integrally laminating the skin material and thermoplastic resin. The present invention also relates to a molding method using the laminated skin material, a molding method in which a laminated skin material used in the method is preheated, and a laminated molded article.

BACKGROUND OF THE INVENTION

Heretofore, a high-class molded article whose appearance and soft feeling are enhanced by laminating a skin material on a thermoplastic resin molded article has widely been known. As the skin material, there has been used soft polyvinyl chloride backed with a foam layer of polyolefin, polyurethane resin, etc. to impart cushioning characteristics. Examples of a method of producing a laminated molded article with the skin include a method in which a molded article is obtained by firstly molding a thermoplastic resin according to various molding methods such as injection molding, etc. and then molding a skin material on the molded article by vacuum molding, and a method of adhesion-laminating using an adhesive while simultaneous molding is conducted.

However, it has been known that the above methods have the following drawbacks.

The polyvinyl chloride skin material has a large specific gravity and it is inferior in light resistance. When using it as a skin material of a component exposed to the direct rays of the sun, severe deterioration of surface appearance and feeling occurs. Since the polyvinyl chloride skin material is softened by adding a large amount of a plasticizer, there arose a problem that a front glass becomes dim due to an influence of the plasticizer when using it as an interior automotive trim.

There is also a problem that polyvinyl chloride evolves a hydrogen chloride gas when it is burned and, therefore, disposal of the waste by incineration often causes environmental sanitation or a problem of corroding various processing equipment.

According to the method using an adhesive, the process becomes complicated and the cost becomes high. Further, this method has a problem of environmental pollution due to a solvent, a dispersant, etc. which are used for the adhesive.

In order to solve the above problems, a polyolefin elastomer skin is suggested as the skin material in place of the polyvinyl chloride skin. Using the polyolefin elastomer skin, however, often causes molding failure.

A lamination integral molding of the skin and thermoplastic resin is also suggested as an improved method for production (e.g. JP-A-4-73112). That is, JP-A-4-73112 discloses that the above-mentioned molding failure is solved by a method which comprises disposing a laminated skin material, which comprises an olefin thermoplastic elastomer sheet backed with a foam layer, between non-closed male and female molds, feeding a molten thermoplastic resin between the foam layer and the male or female mold, and putting the male and female molds together to integrally laminate the skin material and thermoplastic resin, controlling the tensile strength of the thermoplastic elastomer and the friction resistance between the thermoplastic elastomer and a metal surface.

In these methods, however, collapse and break of the foam can not be completely prevented, depending on the thickness, constitution ratio, contents and the like of the thermoplastic elastomer sheet and foam. That is, a thinner thermoplastic elastomer layer is tend to be used recently for cost reduction and the above-mentioned failure sometimes arise even if using a thermoplastic elastomer which has imparted a good appearance heretofore.

OBJECTS OF THE INVENTION

It is an object of the present invention to provide a molded article having good appearance regardless of the thickness of thermoplastic elastomer layer, etc., a skin material used for obtaining the molded article, and a method for producing the molded article.

This object as well as other objects and advantages of the present invention will become apparent to those skilled in the art from the following description with reference to the accompanying drawings.

SUMMARY OF THE INVENTION

The present invention provides a laminated skin material which comprises an olefin thermoplastic elastomer composition layer and an olefin resin foam layer, and satisfies the following conditions (1) and (2):

$(\theta_2/\theta_1) \times 100 > 1$  condition (1):

in which $\theta_1$ is a gradient at the initial stage of stretching and $\theta_2$ is a gradient after passing an inflection point in a curve of tensile elongation (abscissa) versus stress (ordinate) at the temperature of 23° C.; and condition (2): a tensile elongation (E) is not less than 90% in the curve of tensile elongation (abscissa) versus stress (ordinate) at the temperature of 23° C. at a tensile strength same to the tensile strength at fracture (T) of the laminated skin material at the temperature of 50° C.

The present invention also provides a molding method which comprises disposing the above laminated skin material between male and female molds, feeding a molten thermoplastic resin between the skin material and a male or female mold, and integrally laminating the skin material and thermoplastic resin (hereinafter this method is referred to as "method I").

The present invention further provides a molding method which comprises preheating a laminated skin material, which is not limited to the above laminated skin material of the present invention, to a temperature within a range from 40 to 100° C. and satisfying the following condition (3):

$$(\theta_4/\theta_3) \times 100 > 1$$

in which $\theta_3$ is a gradient at the initial stage of stretching and $\theta_4$ is a gradient after passing an inflection point in a curve of tensile elongation (abscissa) versus stress (ordinate) at the temperature (hereinafter this method is referred to as "method II").

The present invention still further provides a laminated molded article obtained by the above molding method.

DETAILED DESCRIPTION OF THE INVENTION

The laminated skin material of the present invention comprises an olefin thermoplastic elastomer composition layer and an olefin resin foam layer.

Specific examples of the olefin thermoplastic elastomer composition include those containing olefin resin (A) and ethylene-α-olefin copolymer type rubber (B). As the olefin resin (A), polypropylene or a copolymer of propylene and another α-olefin is preferred. In the copolymer of propylene and α-olefin, the amount of the α-olefin is usually 60 parts by mole or less per 100 parts by mole of propylene. Examples of the α-olefin include ethylene, 1-butene, 1-pentene, 3-methyl-1-butene, 1-hexene, 1-decene, 3-methyl-1-pentene, 4-methyl-1-pentene and 1-octene. Among the above-exemplified olefin resin (A), polypropylene is preferred. Any of random, block and homo types can be used. A melt flow rate of the olefin resin (A) is normally within the range from 0.05 to 100 g/10 minutes, preferably from 0.1 to 70 g/10 minutes.

Polyethylene or a copolymer of ethylene and α-olefin having four or more carbon atoms can be used in combination with polypropylene in the olefin resin (A). The amount of polyethylene or a copolymer of ethylene and α-olefin having four or more carbon atoms in the olefin resin (A) is usually 80 parts by weight or less per 100 parts by weight of the olefin resin (A).

In the copolymer of ethylene and α-olefin having four or more carbon atoms, the amount of the α-olefin is usually 20 parts by mole or less per 100 parts by mole of ethylene. Examples of the α-olefin having four or more carbon atoms include 1-butene, 1-pentene, 3-methyl-1-butene, 1-hexene, 1-decene, 3-methyl-1-pentene, 4-methyl-1-pentene and 1-octene. Among them, 1-butene, 1-hexene, and 1-octene are preferred. More preferably, a copolymer of ethylene and 1-hexene or 1-octene is used in view of excellent appearance of the molded article and high strength of the skin material.

As the ethylene-α-olefin copolymer type rubber (B), an ethylene-α-olefin copolymer rubber or an ethylene-α-olefin-nonconjugated diene copolymer rubber is preferred in view of excellent light resistance and heat aging resistance. Among them, an ethylene-propylene copolymer rubber is more preferred. Examples of the α-olefin in the ethylene-α-olefin-copolymer rubber include propylene, 1-butene, 1-pentene, 1-hexene, 4-methyl-1-pentene, 1-octene and 1-decene. Among them, propylene and 1-octene are preferred.

Examples of the α-olefin in the ethylene-α-olefin-nonconjugated diene copolymer rubber include propylene, 1-butene, 1-pentene, 1-hexene, 4-methyl-1-pentene, 1-octene and 1-decene. Among them, propylene is preferred. Examples of the nonconjugated diene include chain nonconjugated diene such as 1,4-hexadiene, 1,6-octadiene, 2-methyl-1,5-hexadiene, 6-methyl-1,5-heptadiene and 7-methyl-1,6-octadiene; cyclic nonconjugateddiene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and triene such as 2,3-diisopropylidene-5-norbornene, 2-ethylidene-3-isopropylidene-5-norbornene,2-propenyl-2,2-norbornadiene, 1,3,7-octatriene and, 1,4,9-decatriene. Among them, 5-ethylidene-2-norbornene or dicyclopentadiene is preferred.

The molar ratio of ethylene to α-olefin in the ethylene-α-olefin type copolymer rubber is normally from 1:0.1 to 1:1.

When using the ethylene-α-olefin-nonconjugated diene copolymer rubber, the amount of the nonconjugated diene is normally from 5 to 20 in iodine value.

Preferred examples of the ethylene-α-olefin type copolymer rubber include ethylene-propylene copolymer rubber wherein the content of propylene is from 10 to 40% by weight, preferably from 20 to 35% by weight.

The Mooney viscosity of the ethylene-α-olefin copolymer type rubber at 100° C. ($ML_{1+4}$ 100° C.) is preferably in the range of 10–150, more preferably in the range of 10–90. When the Mooney viscosity is too small, the mechanical strength is sometimes inferior. On the other hand, when the Mooney viscosity is too large, the appearance of the molded article sometimes become worse.

It is preferred that a weight ratio of the olefin resin (A) to the ethylene-α-olefin copolymer type rubber (B) is from 10:90 to 60:40. When the weight ratio is too small, the appearance of the skin material sometimes becomes worse. On the other hand, when the weight ratio is too large, the feeling is inferior due to lack of flexibility, and the skin material is sometimes broken at the time of molding to cause appearance failure.

It is preferred that the olefin thermoplastic elastomer composition of the present invention contains a mineral oil softener (C) in addition to the above components (A) and (B), and a part or all of the component (B) is dynamically crosslinked, since a molded article which is flexible and has large processability leading to good appearance can be obtained easily. Specific examples of the mineral oil softener include paraffinic oil. It is preferred that the amount of the component (C) is from 5 to 40 parts by weight per 100 parts by weight of the total amount of the components (A) and (B). When the amount of the component (C) is too small, it is hard to obtain excellent feeling due to lack of flexibility. On the other hand, when the amount of the component (C)

is too large, the component (C) is sometimes deposited on the surface to cause contamination of or adhesion to the product.

When using the component (C), it can be used in the form of a so-called oil-extended rubber containing the component (C). In this case, the preferred Mooney viscosity may be within the above preferred range in the oil-extended state.

As a method of dynamically crosslinking the component (B), a known method can be used, for example, methods described in JP-A-48-26838, JP-A-54-99156, JP-A-1-103639 and Japanese Patent Application No. 7-249442. The degree of crosslinking has a large influence on properties of the obtained molded article. Since the dynamic crosslinking is normally conducted where both components (A) and (B) are existed, after the dynamically crosslinking, components (A) and (B) in the non-crosslinked state are often added in the amount within the range where no problem arises to form a thermoplastic elastomer layer for skin material. As the components (A) in the non-crosslinked state to be added after the dynamically crosslinking, the above-mentioned polyethylene or copolymer of ethylene and α-olefin having four or more carbon atoms is preferably used. Two or more kinds of dynamically crosslinked components (A) or (B) may be used in combination for a thermoplastic elastomer layer.

In addition to the above mentioned components, antioxidants, thermal stabilizers, ultraviolet absorbers, lubricants, antistatic agents, pigments, fillers and flame retardants may be optionally added to the olefin thermoplastic elastomer composition of the present invention. Examples of a method of producing the composition include melt kneading by twin-screw extruder, Banbury mixer or the like. In case of processing the skin material, the composition may be dry-blended to form a thermoplastic elastomer layer of the skin material.

Examples of the olefin resin constituting the olefin resin foam layer of the present invention include polypropylene and polyethylene. Among them, polypropylene is preferred in view of the heat resistance. It is possible to apply a coating material on the surface of the thermoplastic elastomer composition layer of the present invention for the purpose of preventing scratch. As the coating material, urethane or acrylic coating material is preferred. The urethane coating material is particularly preferred in view of the feeling.

Examples of the method of producing the laminated skin material from the thermoplastic elastomer composition layer, the resin foam layer end the coating material include a method of laminating the resin foam layer after or while the thermoplastic elastomer is processed to form a sheet by a calendering method or a T-die extrusion molding method, and applying a coating material using a coating device such as guravure coater before or after laminating. In that case, the sheet surface can be embossed.

It is necessary that the laminated skin material of the present invention satisfies the following conditions (1) and (2):

$$(\theta_2/\theta_1) \times 100 > 1 \quad \text{condition (1):}$$

in which $\theta_1$ is a gradient at the initial stage of stretching and $\theta_2$ is a gradient after passing an inflection point in a curve of tensile elongation (abscissa) versus stress (ordinate) at the temperature of 23° C.; and condition (2): a tensile elongation (E) is not less than 90% in the curve of tensile elongation (abscissa) versus 25 stress (ordinate) at the temperature of 23° C. at a tensile strength same to the tensile strength at fracture (T) of the skin material at the temperature of 50° C.

When the condition (1) is not satisfied, the skin material is not uniformly stretched at the time of molding or wrinkle is remained and, as the result, the appearance of the molded article becomes inferior. On the other hand, when the condition (2) is not satisfied, the skin material is liable to be broken at the time of molding or the foam layer is molten to cause unevenness of the surface of the molded article.

Figure 1:
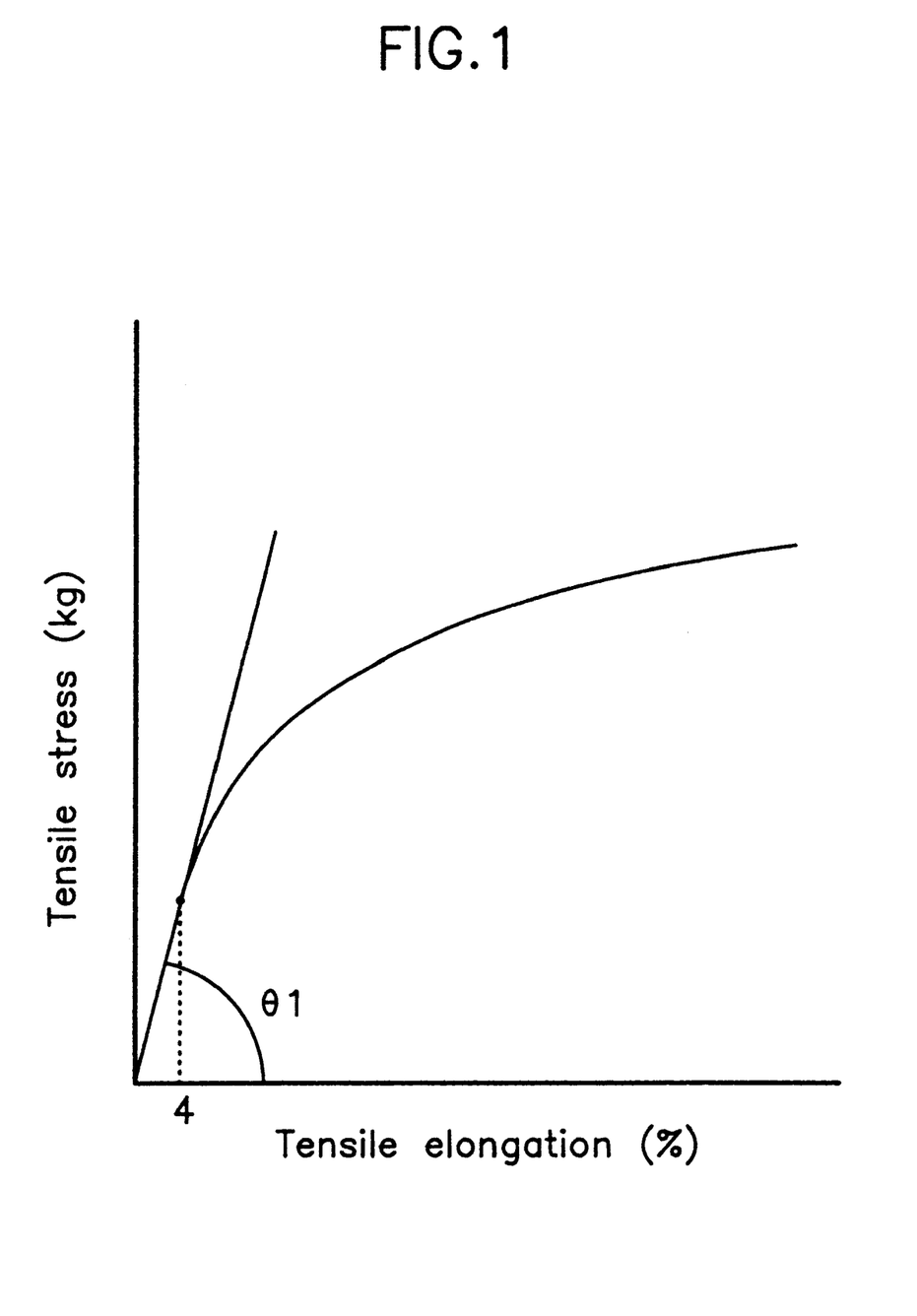
FIG. 1 is a graph illustrating a specific method of determining a gradient ($\theta_1$) at the initial stage of stretching under the condition (1).
Figure 2:
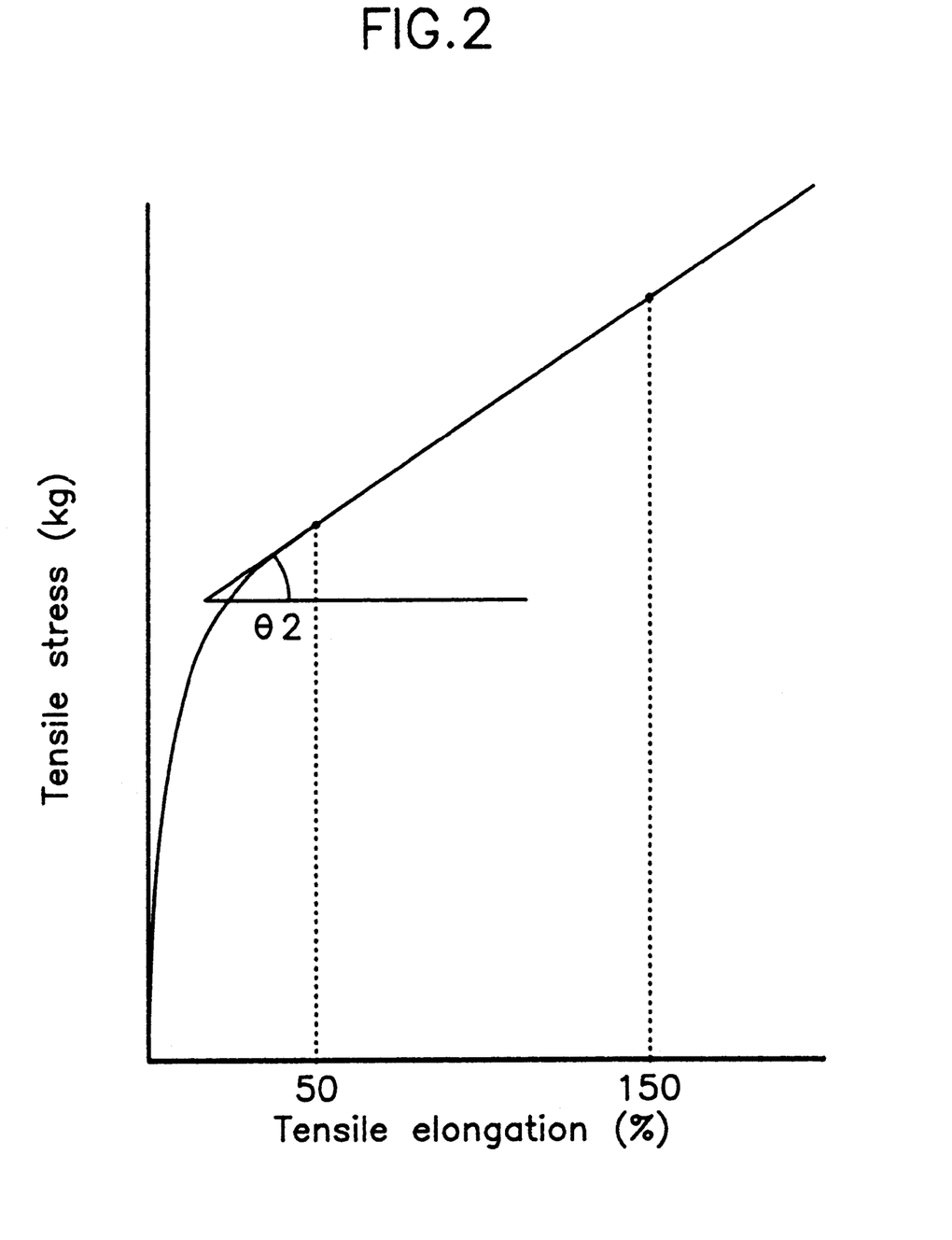
FIG. 2 is a graph illustrating a specific method of determining a gradient ($\theta_2$) after passing an inflection point under the condition (1).

An example of the evaluation method of the condition (1) will be explained below. As a tensile tester, a normal commercially available one can be used. As a tensile specimen, JIS K6301 JIS No. 1 dumbbell specimen is used. The elongation is calculated on the basis of the distance between gripped portions and change of the distance. First, the specimen is stretched at a stress rate of 200 mm/min. at the environmental temperature of 23° C. to obtain a stress-strain (tensile elongation) curve (S—S curve). Then, a gradient ($\theta_1$) of the initial stage of stretching (unit: kg/%) is obtained by dropping a perpendicular line from the point at a distance 4% (abscissa) from an initial point to a S—S curve, and connecting an intersection of the perpendicular line and the S—S curve to a S—S initial point (FIG. 1). Then, a gradient ($\theta_2$) after passing an inflection point (unit: kg/%) is obtained by dropping perpendicular lines from the point at a distance 50% (abscissa) from the initial point and the point at a distance 150% (abscissa) from the initial point to a S—S 25 curve, respectively, and connecting the respective intersections of the perpendicular lines and S—S curve (FIG. 2). It is necessary that the present invention satisfies the following expression:

$$(\theta_2/\theta_1) \times 100 > 1$$

with respect to these gradient ($\theta_1$) and gradient ($\theta_2$), as described above.

Figure 3:
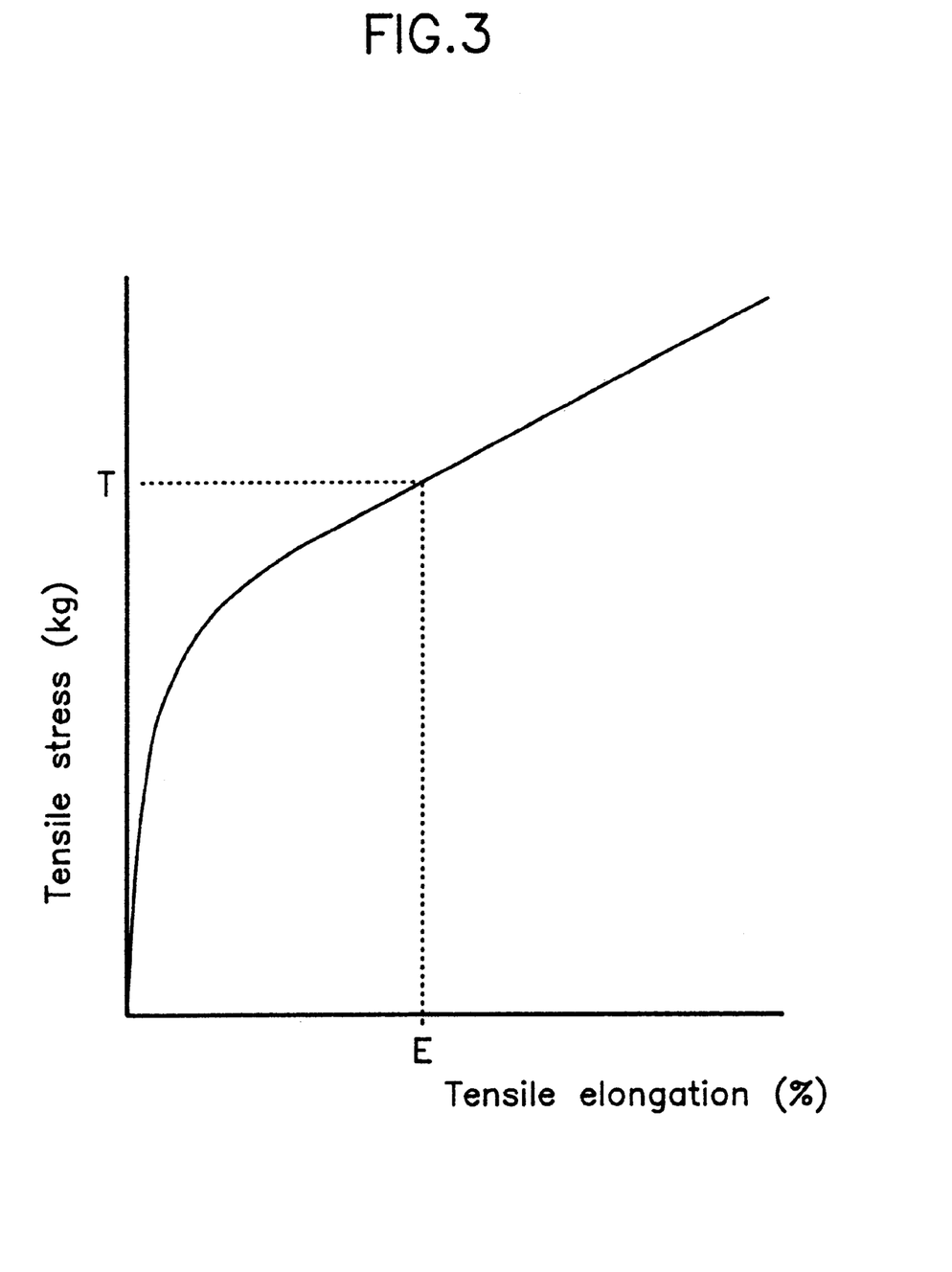
FIG. 3 is a graph illustrating a specific method of determining E from T under the condition (2).

An example of the evaluation method of the condition (2) will be explained below. First, the skin material is subjected to the same tensile test as that of the condition (1) except that the environmental temperature is 50° C. and a tensile strength at fracture (T) (unit: kg) is measured. Then, a horizontal line passing through a point (T) is drawn in the coordinate of the S—S-curve at 23° C. used in the condition (1), and an intersection of the horizontal line and the S—S-curve at 23° C. is determined. Then, a perpendicular line passing through the intersection is drawn and an intersection E (value of elongation: %) of the perpendicular line and abscissa (tensile elongation) is determined (FIG. 3). It is necessary that this value of the elongation is not less than 90% in the present invention.

The molding methods of the present invention will be explained below. The molding method I of the present invention comprises disposing the laminated skin material of the present invention between male and female molds, feeding a molten thermoplastic resin between the skin material and the male or female mold, and integrally laminating the skin material and thermoplastic resin.

The molding method II of the present invention comprises preheating a laminated skin material to a temperature within a range from 40 to 100° C. and satisfying the following condition (3):

$$(\theta_4/\theta_3) \times 100 > 1$$

in which $\theta_3$ is a gradient at the initial stage of stretching and $\theta_4$ is a gradient after passing an inflection point in a curve of tensile elongation (abscissa) versus stress (coordinate) at the temperature; then disposing it between male and female molds; feeding a molten thermoplastic resin between the skin material and a male or female mold; and integrally laminating the skin material and thermoplastic resin. That is, the skin material is molded after heating to the temperature at which the S—S curve satisfies the following formula.

$$(\theta_4/\theta_3) \times 100 > 1$$

The laminated skin material which can be used in the method II is not limited to the above laminated skin material of the present invention. Therefore, although a step of preheating is added, an effect capable of widely selecting the skin material can be obtained.

Even in the molding method I, it is preferred that the skin material is heated to the temperature satisfying the condition (3) before laminating the skin material with the thermoplastic resin.

The molded article of the present invention is a laminated molded article obtainable by the above molding method I or II. As the thermoplastic resin, a polypropylene resin is preferred in view of the recycling properties, heat resistance and rigidity.

In the present invention, the laminated molded article can also be obtained by a method of disposing a laminated skin material between male and female molds, feeding a molten thermoplastic resin between the skin material and the male or female mold, and putting the male and female molds together; or a method of placing a preheated thermoplastic resin sheet on a lower mold in place of feeding the molten thermoplastic resin, closing the molds, cooling under pressure to form a core material layer of the thermoplastic resin sheet, and integrally laminating the sheet with the laminated skin material. Furthermore, there can also be used a method of disposing a laminated skin material between male and female molds, closing the male and female molds and feeding a molten thermoplastic resin, followed by integrally laminating.

Hereinafter, one embodiment of a method for producing the laminated molded article according to the present invention will be explained in detail with reference to the accompanying drawings.

Figure 4:
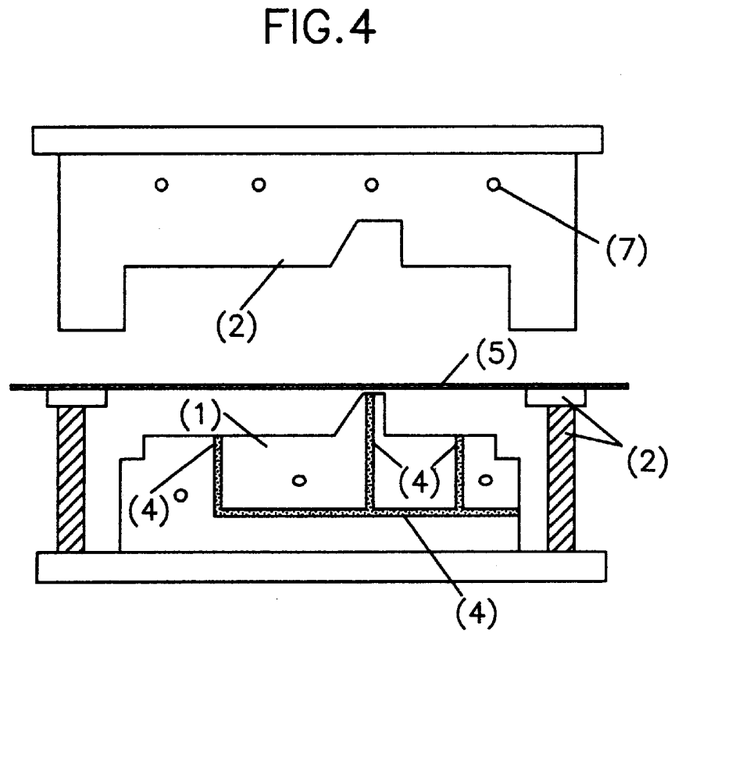
FIG. 4 is a sectional view illustrating the state where a laminated skin material is disposed between non-closed male and female molds in the production process of a laminated molded article according to the present invention.

[1] A laminated skin material (5) having a layer of a thermoplastic elastomer sheet as its outermost layer is cut into a form of a continuous sheet or a sheet having a suitable size, and disposed on a male mold (1) (FIG. 4).

Figure 5:
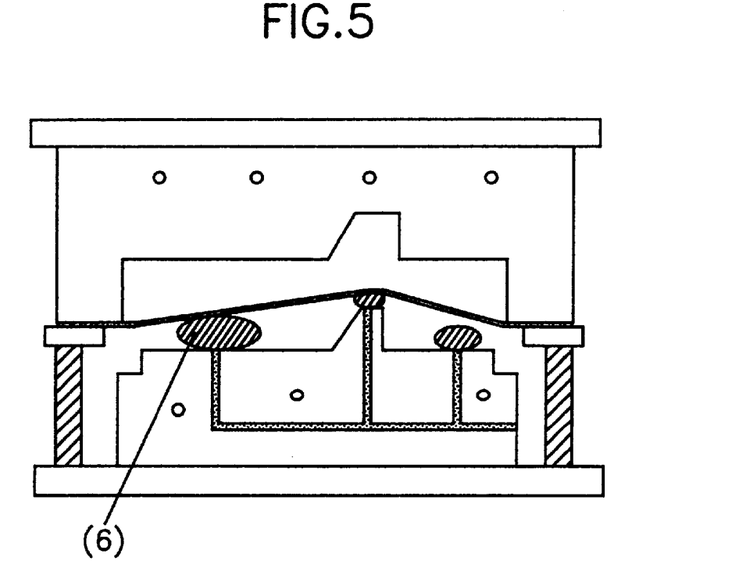
FIG. 5 is a sectional view illustrating the state where a molten thermoplastic resin is fed while the female mold is being lowered in the production process of a laminated molded article according to the present invention.

[2] Then, a female mold (2) is lowered and, after holding the laminated skin layer (5) with a suitable clamping force between a stationary flame (3) and the male mold (1), a molten thermoplastic resin (6) is fed between the laminated skin material (5) and the male mold (1) in the state where the female mold (2) and male mold (1) are not closed (FIG. 5). The molten thermoplastic resin (6) is fed through a molten resin passage (4) provided in the male mold (1).

[3] When the female mold (2) and stationary flame (3) are further lowered in the state while holding the laminated skin material (5), the molten thermoplastic resin (6) flows with pressing the laminated skin material (5) to the female mold (2), and the laminated skin material (5) is drawn into the concave part of the female mold (2) while the periphery of the laminated skin material (5) is slid between the stationary flame (3) and female mold (2), and the laminated skin material (5) is being stretched.

Figure 6:
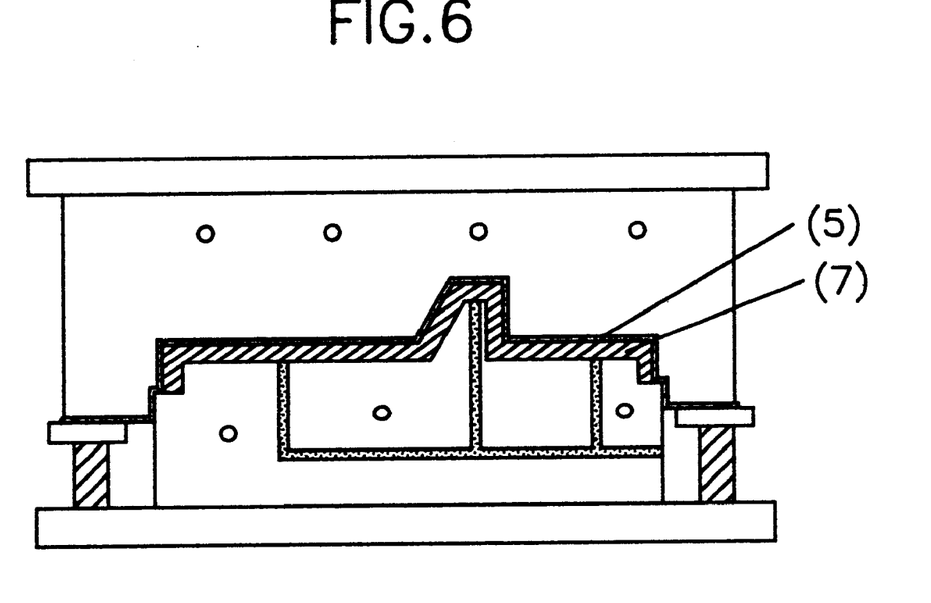
FIG. 6 is a sectional view illustrating the state where molding has been accomplished after closing male and female molds in the production process of a laminated molded article according to the present invention.
Figure 7:
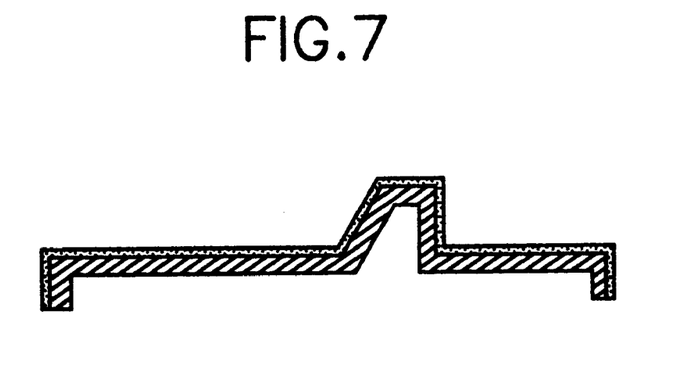
FIG. 7 is a schematic diagram illustrating a section of the molded article.

[4] When the female mold (2) is continuously lowered furthermore, the male and female molds (1,2) are completely closed and the laminated skin material (5) and thermoplastic resin (7) are integrated, thus accomplishing the molding (FIG. 6).

[5] After cooling, the female mold (2) is raised and the laminated molded article wherein the laminated skin material (5) and thermoplastic resin (7) are laminated each other is removed.

In the present invention, a laminated molded article having good surface appearance and soft feeling can be obtained by disposing a laminated skin material comprising a layer of a thermoplastic elastomer having a thickness of 0.2 to 1.0 mm between non-closed female and male molds at 20 to 60° C., feeding a molten thermoplastic resin at 150 to 250° C. or a thermoplastic resin sheet preheated by an oven at a suitable temperature to the resin foam layer side of the skin material, closing the molds and molding at a press pressure of 20 to 150 kg/cm².

The molding method described above was an embodiment of the present invention. The position of the male and female molds, presence or absence of the stationary flame for male and female molds, feeding method of the molten thermoplastic resin or preheated thermoplastic resin sheet and structure of processing of the terminal end part can be freely selected within the scope of the present invention.

The laminated molded article of the present invention can be suitably used in the filed of interior automotive trims.

The following Examples and Comparative Examples further illustrate the present invention in detail but are not to be construed to limit the scope of the present invention. The test methods used for measuring physical properties in the Examples and Comparative Examples are as follows.

(1) Mooney viscosity ($ML_{1+4}$ 100° C.)

It was measured according to ASTM D927-57T. EPDM was calculated by the following equation:

$$\log (ML_1/ML_2) = 0.0066 \ (\Delta PHR)$$

$ML_1$: Mooney viscosity of EPDM $ML_2$: Mooney viscosity of oil-extended EPDM $\Delta PHR$: Oil extension amount based on 100 parts by weight of EPDM.

(2) Melt flow rate (MFR)

It was measured according to JIS K-7210 at following conditions:

230° C., 2.16 kg (polypropylene)

190° C., 2.16 kg (polyethylene)

(3) Tensile test of laminated skin material

A laminated sheet backed with a resin foam layer was stamped by a No. 1 dumbbell described in JIS K-6301, and the resulting specimen was subjected to a tensile test under the conditions of a distance between griped portions of 60 mm and a stress rate of 200 mm/min. Then, the measurement was conducted whether the conditions (1), (2) and (3) are satisfied. It was carried out by the same method as the method whose detail was described above.

(4) Evaluation of appearance of laminated molded article

It was visually observed whether appearance failure (e.g. break of skin material, etc.) is present or not.

The method of producing three kinds of crosslinked thermoplastic elastomers (TPO-1, TPO-2, TPO-3) used in Examples and Comparative examples are described below.

(1) TPO-1

After 70 parts by weight of EPM-1 [ethylene-propylene copolymer rubber, content of propylene: 22% by weight, $ML_{1+4}$ 100° C.=35], 30 parts by weight of PP-1 (homopolypropylene, MFR=10 g/10 min.) and 0.4 parts by weight of N,N'-m-phenylenebismaleimide (Sumifine BM, manufactured by Sumitomo Chemical Industries Co., Ltd.) as a crosslinking aid were kneaded at 170–200° C. for 7 minutes using a Banbury mixer, a pelletized masterbatch was produced using an extruder. Then, 100 parts by weight of the master batch was uniformly blended with 0.04 parts by weight of 2,5-dimethyl-2,5-di(t-butylperoxy)hexane using a Henschel mixer for 3 minutes. The resulting blend was subjected to a dynamic heat treatment at 240 to 260° C. using a twin-screw extruder (TEX-44HC, manufactured by THE JAPAN STEEL WORKS LTD.) for about 30 seconds to obtain a crosslinked thermoplastic elastomer pellet (hereinafter referred to as "TPO-1").

(2) TPO-2

The same operation as that of TPO-1 was conducted except that 75 parts by weight of EPM-1 was used and 25 parts by weight of PP-2 (propylene-ethylene copolymer, MFR=15 g/10 min., Sumitomo Norblen (trade mark) AY961, manufactured by Sumitomo Chemical Industries Co., Ltd.) was used in place of PP-1 to obtain a crosslinked elastomer pellet (hereinafter referred to as "TPO-2").

(3) TPO-3

The same operation as that of TPO-1 was conducted except that 85 parts by weight of an oil-extended EPDM-1 ($ML_{1+4}$ 100° C.=53), which was obtained by adding a mineral oil softener (Dianaprocess oil PW-380, manufactured by Idemitsu Kosan Co., Ltd.) in the amount of 100 parts by weight based on 100 parts by weight of EPDM-1 to a 5 wt % hexane solution of EPDM-1 [ethylene-propylene-ethylidene norbornene (ENB) copolymer rubber, iodine value=12, content of propylene=28% by weight, $ML_{1+4}$ 100° C.=242], followed by desolvation with steam stripping, was used in place of EPM-1, and 15 parts by weight of PP-3 (propylene-ethylene random copolymer, MFR=1 g/10 min., content of ethylene=4.5% by weigh) was used in place of PP-1 to obtain a crosslinked elastomer pellet (hereinafter referred to as "TPO-3").

EXAMPLE 1

After 80 parts by weight of TPO-1 was blended with 20 parts by weight of an ethylene-hexene copolymer [MFR=2, density=0.912: hereinafter referred to as "PE"] using a tumbler mixer, an embossed thermoplastic elastomer sheet having a thickness of 0.5 mm was produced at 230° C. using a T-die extruder. While producing the embossed thermoplastic elastomer sheet, a polyolefin resin foam sheet (PPSM15030, manufactured by Toray Co., Ltd.) was thermally fused and adhered to one side of the embossed thermoplastic elastomer sheet to give a sheet of a two-layer structure.

Then, High Cope UL-4001 (manufactured by Tokushu Shikiryo Kogyo Co., Ltd.) as a primer of a surface coating treatment was applied on the surface of the thermoplastic elastomer layer in a thickness of 1 to 3 μm and, after drying, an urethane topcoating High Cope UEU (manufactured by Tokushu Shikiryo Kogyo Co., Ltd.) was further applied in a thickness of 2 to 5 μm, followed by drying to obtain a laminated skin material.

The value of the conditions (1) and (2) of this laminated skin material is shown in Table 1.

This laminated skin material was disposed in an automotive door mold having a non-closed armrest part with the foam upside down (FIG. 4) and a plasticized molten polypropylene (Sumitomo Norblen (trade mark) AZ564, manufactured by Sumitomo Chemical Industries Co., Ltd.) was fed through a resin passage provided in a lower mold (FIG. 5). Then, the molds were closed for molding (FIG. 6). As a result, a laminated molded article in good state where no appearance failure (e.g. break of laminated skin material, collapse of resin foam layer, etc.) is observed. A mold temperature at the time of molding was 50° C. and the laminated skin material was applied at normal state without subjecting to a heat treatment.

EXAMPLE 2

The same operation as that in Example 1 was conducted except that 56 parts by weight of TPO-1 and 24 parts by weight of TPO-3 were used in place of 80 parts by weight of TPO-1 to obtain a laminated molded article having good appearance. A value of the laminated skin material used is shown in Table 1.

COMPARATIVE EXAMPLE 1

The same operation as that in Example 1 was conducted except that 56 parts by weight of TPO-2 and 24 parts by weight of TPO-3 were used in place of 80 parts by weight of TPO-1. Break of the skin material occurred and a laminated molded article having good appearance was not obtained. A value of the laminated skin material used is shown in Table 1.

COMPARATIVE EXAMPLE 2

The same operation as that in Example 1 was conducted except that 20 parts by weight of PP-3 was used in place of 20 parts by weight of PE. Break of the skin material and wrinkle at the vicinity of the armrest part occurred and a laminated molded article having good appearance was not obtained. A value of the laminated skin material used is shown in Table 1.

EXAMPLE 3

According to the same manner as that in Comparative Example 2 except that the laminated skin material was applied to molding after preheating to 50° C., a laminated molded article having good appearance was obtained. A value of the condition (3) of the laminated skin material at 50° C. is shown in Table 1. As is apparent from this result, a good molded article is also obtained by preheating the laminated skin material, which causes failure without preheating, to the temperature satisfying the condition (3).

TABLE 1

| Thermoplastic elastomer | Example 1 | Example 2 | Comparative example 1 | Comparative example 2 | Example 3 |
| --- | --- | --- | --- | --- | --- |
| TPO-1 | 80 | 56 | | 80 | 80 |
| TPO-2 | | | 56 | | |
| TPO-3 | | 24 | 24 | | |
| PE | 20 | 20 | 20 | | |
| PP-3 | | | | 20 | 20 |
| Condition 1 ($\theta_2/\theta_1$) × 100 | 1.2 | 1.6 | 1.5 | 0.6 | 0.6 |
| Value E of condition 2 | 111 | 113 | 80 | 20 | 20 |
| Condition 3 ($\theta_2/\theta_1$) × 100 at 50° C. | — | — | — | — | 1.5 |
| Preheating of skin material | None | None | None | None | Conducted |
| Appearance of molded article | ◯ | ◯ | X | X | ◯ |

A laminated skin material, which comprises an olefin thermoplastic elastomer composition layer and an olefin resin foam layer, according to the present invention does not cause undesirable break, unevenness and wrinkle of the skin material when a laminated molded article is produced by disposing the laminated skin material between male and female molds, feeding a molten thermoplastic resin between the laminated skin material and the male or female molds, and integrally laminating the skin material and thermoplastic resin. Therefore, according to the molding method I of the present invention, a laminated molded article having good appearance can be obtained. A laminated molded article having good appearance can also be obtained according to the molding method II of the present invention, even when a laminated skin material which causes failure without preheating is used.

What is claimed is:

1. A molding method which comprises:

preheating a laminated skin material comprising an olefin thermoplastic elastomer composition layer and an olefin resin foam layer to a temperature within a range from 40 to 100° C., and satisfying the following condition:

$$(\theta_4/\theta_3) \times 100 > 1$$

in which $\theta_3$ is a gradient of a straight line obtained by connecting a point corresponding to 4% elongation of a stress-strain curve obtained by a tensile test of said laminated skin material according to JIS K-6301 to a point corresponding to the initial stage of stretching of said laminated skin material and a straight line to abscissa and $\theta_4$ is a gradient of a straight line obtained by connecting points corresponding to 50% and 150% elongation of said stress-strain curve to each other with a straight line to abscissa, at the temperature;

disposing the preheated laminated skin material between male and female molds, feeding a thermoplastic resin which is molten, between the laminated skin material and the male or female mold; and integrally laminating the laminated skin material and the thermoplastic resin.

2. A molding method according to claim 1, wherein the olefin thermoplastic elastomer composition contains component (A): an olefin resin; and component (B): an ethylene-α-olefin copolymer rubber or an ethylene-α-olefin-nonconjugated diene copolymer rubber.

3. A molding method according to claim 2, wherein the component (A) is polypropylene.

4. A molding method according to claim 2, wherein the component (B) is an ethylene-propylene copolymer rubber.

5. A molding method according to claim 2, wherein a weight ratio of the component (A) to the component (B) is from 10:90 to 60:40.

6. A molding method according to claim 2, wherein the olefin thermoplastic elastomer composition contains component (C): mineral oil softener, in addition to the components (A) and (B), and a part or all of the component (A) is dynamically crosslinked.

7. A molding method according to claim 6, wherein the component (C) is a paraffinic oil.

8. A molding method according to claim 6, wherein the amount of the component (C) is from 5 to 40 parts by weight based on 100 parts of the total amount of the components (A) and (B).

9. A molding method according to claim 1, wherein the olefin resin foam is a foam of polypropylene.

* * * * *